United States Patent
Tao et al.

(10) Patent No.: US 11,816,865 B2
(45) Date of Patent: Nov. 14, 2023

(54) EXTRINSIC CAMERA PARAMETER CALIBRATION METHOD, EXTRINSIC CAMERA PARAMETER CALIBRATION APPARATUS, AND EXTRINSIC CAMERA PARAMETER CALIBRATION SYSTEM

(71) Applicant: Shenzhen Horizon Robotics Technology Co., Ltd., Shenzhen (CN)

(72) Inventors: Ye Tao, Shenzhen (CN); Hongzhi Zhang, Shenzhen (CN)

(73) Assignee: Shenzhen Horizon Robotics Technology Co., Ltd.

( * ) Notice: Subject to any disclaimer, the term of this patent is extended or adjusted under 35 U.S.C. 154(b) by 0 days.

(21) Appl. No.: 17/535,203

(22) Filed: Nov. 24, 2021

(65) Prior Publication Data

US 2022/0164987 A1    May 26, 2022

(30) Foreign Application Priority Data

Nov. 25, 2020   (CN) .......................... 202011344151.0

(51) Int. Cl.
*G06T 7/80* (2017.01)
*G06T 7/33* (2017.01)

(52) U.S. Cl.
CPC ................ *G06T 7/80* (2017.01); *G06T 7/337* (2017.01); *G06T 2207/30244* (2013.01); *G06T 2207/30268* (2013.01)

(58) Field of Classification Search
CPC ....................................................... G06T 7/80
See application file for complete search history.

(56) References Cited

U.S. PATENT DOCUMENTS

| | | | |
|---|---|---|---|
| 2007/0033999 A1* | 2/2007 | Bothe ....................... | G06T 7/80 |
| | | | 250/252.1 |
| 2010/0295948 A1* | 11/2010 | Xie ........................... | G06T 7/80 |
| | | | 348/E17.002 |
| 2015/0049193 A1* | 2/2015 | Gupta ..................... | G03B 43/00 |
| | | | 348/148 |

* cited by examiner

*Primary Examiner* — Xiaolan Xu
(74) *Attorney, Agent, or Firm* — Harness, Dickey & Pierce, P.L.C.

(57) ABSTRACT

Disclosed are an extrinsic camera parameter calibration method, apparatus and system. The method includes: obtaining a calibration image photographed for a target location in a calibration cabin by a first camera provided therein; determining calibration feature information of the target location from the calibration image; obtaining reference feature information pre-determined from a reference image photographed for a target location in a reference cabin by a second camera provided therein; determining position-posture change data of the first relative to the second camera based on a calibration location of the calibration feature information in the calibration image and a reference location of the reference feature information in the reference image; and determining an extrinsic parameter of the first camera based on the position-posture change data. The extrinsic parameter of the first camera can be calibrated in real time and is closer to a currently actual state of the first camera when used.

20 Claims, 6 Drawing Sheets

EXTRINSIC CAMERA PARAMETER CALIBRATION METHOD, EXTRINSIC CAMERA PARAMETER CALIBRATION APPARATUS, AND EXTRINSIC CAMERA PARAMETER CALIBRATION SYSTEM

RELATED APPLICATION INFORMATION

This application claims priority to Chinese patent application No. 202011344151.0 filed on Nov. 25, 2020, incorporated herein by reference.

FIELD OF THE INVENTION

The present disclosure relates to the technical filed of computers, and in particular, to an extrinsic camera parameter calibration method, an extrinsic camera parameter calibration apparatus, an extrinsic camera parameter calibration system, a computer-readable storage medium, and an electronic device.

BACKGROUND OF THE INVENTION

Camera calibration is the most critical part of machine vision inspection, geometric photogrammetry, and the like. The camera calibration aims at calculating geometric information such as a three-dimensional location and a shape of an object based on two-dimensional image information obtained from a camera, so as to obtain correspondence between a point on the two-dimensional image and a point on a surface of the object in space. This relationship is determined by geometric models for camera imaging, and parameters of these models are referred to as camera parameters, which mainly include intrinsic parameters and extrinsic parameters. The camera calibration is a process of calculating these parameters.

Since different cameras are used in different environments, consistency of extrinsic parameters of different cameras may be affected. Errors of an extrinsic camera parameter mainly come from two aspects: tooling errors and human adjustments. The tooling errors are caused by location and angle deviations of the camera due to mechanical, welding, or glue fixing during mounting. When a user uses the mounted camera, sometimes a location and an angle of the camera need to be adjusted. For example, when the camera is mounted on a steering column in a vehicle, the location of the camera changes after a driver adjusts a steering wheel.

SUMMARY OF THE INVENTION

Embodiments of the present disclosure provide an extrinsic camera parameter calibration method, an extrinsic camera parameter calibration apparatus, a computer-readable storage medium, and an electronic device.

An embodiment of the present disclosure provides an extrinsic camera parameter calibration method. The method includes: obtaining a calibration image that is photographed for a target location in a calibration cabin by a first camera provided in the calibration cabin; determining calibration feature information of the target location from the calibration image; obtaining reference feature information pre-determined from a reference image, where the reference image is an image photographed for a target location in a reference cabin by a second camera provided in the reference cabin; determining position-posture change data of the first camera relative to the second camera based on a calibration location of the calibration feature information in the calibration image and a reference location of the reference feature information in the reference image; and determining an extrinsic parameter of the first camera based on the position-posture change data.

According to another aspect of an embodiment of the present disclosure, an extrinsic camera parameter calibration system is provided, wherein the system includes a calibration cabin, a reference cabin, a first camera, a second camera, and an extrinsic parameter calibration device; the first camera is provided in the calibration cabin, the second camera is provided in the reference cabin, and the first camera and the second camera are respectively provided at preset locations in the calibration cabin and the reference cabin; and the extrinsic parameter calibration device is configured to implement the foregoing extrinsic camera parameter calibration method.

According to another aspect of an embodiment of the present disclosure, an extrinsic camera parameter calibration apparatus is provided, wherein the apparatus includes: a first obtaining module which is configured to obtain a calibration image that is photographed for a target location in a calibration cabin by a first camera provided in the calibration cabin; a first determining module which is configured to determine calibration feature information of the target location from the calibration image; a second obtaining module which is configured to obtain reference feature information pre-determined from a reference image, wherein the reference image is an image photographed for a target location in a reference cabin by a second camera provided in the reference cabin; a second determining module which is configured to determine position-posture change data of the first camera relative to the second camera based on a calibration location of the calibration feature information in the calibration image and a reference location of the reference feature information in the reference image; and a third determining module which is configured to determine an extrinsic parameter of the first camera based on the position-posture change data.

According to another aspect of an embodiment of the present disclosure, a computer-readable storage medium is provided, wherein the computer-readable storage medium stores a computer program which is configured to implement the foregoing extrinsic camera parameter calibration method.

According to another aspect of an embodiment of the present disclosure, an electronic device is provided, wherein the electronic device includes: a processor; and a memory configured to store processor-executable instructions, wherein the processor is configured to read the executable instructions from the memory, and execute the instructions to implement the foregoing extrinsic camera parameter calibration method.

On the basis of the extrinsic camera parameter calibration method, the extrinsic camera parameter calibration apparatus, the computer-readable storage medium, and the electronic device that are provided in the foregoing embodiments of the present disclosure, the calibration image that is photographed for the target location in the calibration cabin by the first camera provided in the calibration cabin is obtained; the calibration feature information of the target location is determined from the calibration image; subsequently, the reference feature information pre-determined from the reference image is obtained; next, the position-posture change data of the first camera relative to the second camera is determined based on the calibration location of the calibration feature information in the calibration image and the reference location of the reference feature information in the reference image; and finally, the extrinsic parameter of the first camera is determined based on the position-posture change data. The extrinsic parameter is calibrated by using the image photographed by the first camera mounted in the calibration cabin. Therefore, in the embodiments of the present disclosure, the process of calibrating an extrinsic camera parameter may be ensured to be more convenient without using a calibration apparatus such as a checkerboard, thereby improving efficiency of calibrating the extrinsic camera parameter. Moreover, when a user actually uses the calibration cabin, the extrinsic parameter of the first camera may be calibrated in a real-time manner by using the image photographed by the first camera. In this way, in a case of using the extrinsic parameter, the extrinsic parameter used is closer to a currently actual state of the first camera. And then accuracy of performing various operations (for example, human-eye sight recognition, face posture recognition, and gesture recognition) by using the extrinsic parameter is further improved.

The technical solutions of the present disclosure are further described in detail below with reference to the accompanying drawings and embodiments.

BRIEF DESCRIPTION OF THE DRAWINGS

By describing the embodiments of the present disclosure more detailed with reference to the accompanying drawings, the foregoing and other objectives, features, and advantages of the present disclosure will become more apparent. The accompanying drawings are used to provide further understanding of the embodiments of the present disclosure, constitute a part of the specification, and are used to explain the present disclosure together with the embodiments of the present disclosure, but they do not constitute limitation to the present disclosure. In the accompanying drawings, same reference numerals generally represent same components or steps.

DETAILED DESCRIPTION OF THE EMBODIMENTS

Figure 1:
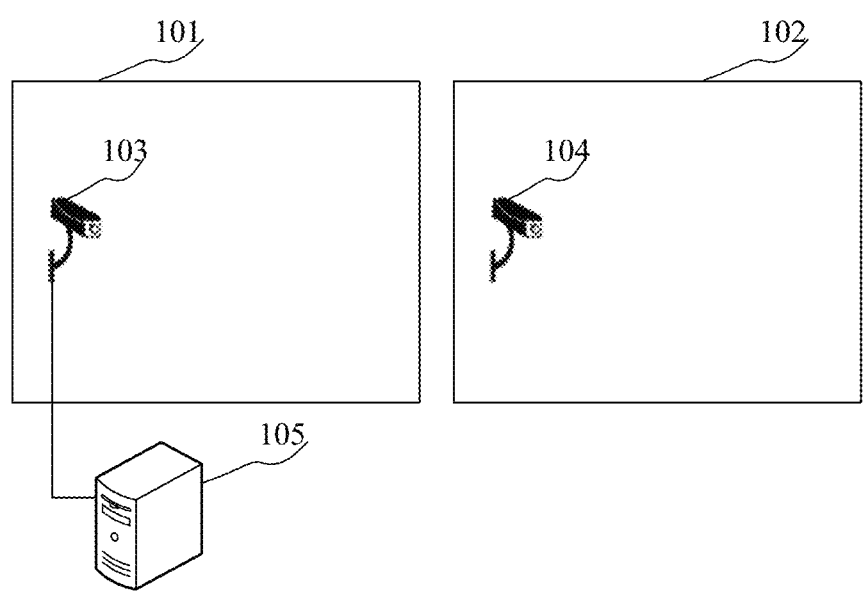
FIG. 1 is a structural diagram of an extrinsic camera parameter calibration system according to an exemplary embodiment of the present disclosure.

In the following, exemplary embodiments according to the present disclosure are described in detail with reference to the accompanying drawings. Obviously, the described embodiments are only some of the embodiments of the present disclosure, and are not all the embodiments of the present disclosure. It should be understood that the present disclosure is not limited by the exemplary embodiments described herein.

It should be noted that unless otherwise specifically stated, relative arrangements of components and steps, numerical expressions, and numerical values that are described in these embodiments do not limit the scope of the present disclosure.

A person skilled in the art may understand that terms such as "first" and "second" in the embodiments of the present disclosure are merely used to distinguish between different steps, devices, or modules, and do not represent any particular technical meaning nor represent a necessary logical order therebetween.

It should also be understood that in the embodiments of the present disclosure, the term "a plurality of" may mean two or more than two, and the term "at least one" may mean one, two, or more than two.

It should also be understood that any component, data, or structure mentioned in the embodiments of the present disclosure generally may be understood as one or more, unless it is clearly defined or opposite enlightenment is given in the context.

In addition, the term "and/or" in the present disclosure describes only an association relationship between associated objects and indicates that three relationships may exist. For example, A and/or B may indicate the following three cases: Only A exists, both A and B exist, and only B exists. In addition, the character "/" in the present disclosure generally indicates an "or" relationship between the associated objects.

It should also be understood that the description of various embodiments of the present disclosure emphasizes the differences between the various embodiments. For same or similar parts between the embodiments, reference may be made to each other, and details are not described herein again for brevity.

At the same time, it should be understood that, for ease of description, the sizes of various parts shown in the drawings are not drawn according to an actual proportional relationship.

The following description of at least one exemplary embodiment is actually illustrative only, and does not serve as any limitation to the present disclosure and application or use of the present disclosure.

The technologies, methods, and devices known to a person of ordinary skills in the relevant fields may not be discussed in detail, but in appropriate cases, the technologies, methods, and devices should be considered as part of the specification.

It should be noted that: similar numbers and characters indicate similar items in the following accompanying drawings. Therefore, once an item is defined in an accompanying drawing, there is no need to further discuss the item in the subsequent accompanying drawings.

The embodiments of the present disclosure may be applied to electronic devices such as a terminal device, a computer system, and a server. The electronic device can operate together with many other general-purpose or special-purpose computing system environments or configurations. Examples of well-known terminal devices, computing systems, environments and/or configurations suitable for use together with the electronic devices such as a terminal device, a computer system, and a server include, but are not limited to: a personal computer system, a server computer system, a thin client, a thick client, a handheld or laptop device, a microprocessor-based system, a set-top box, programmable consumer electronics, a network personal computer, a small computer systems, a mainframe computer system, and a distributed cloud computing technology environment including any of the foregoing systems, and the like.

The electronic devices such as a terminal device, a computer system, and a server may be described in general context of computer system-executable instructions (such as a program module) executed by the computer system. Generally, the program module may include a routine, a program, a target program, a component, logic, a data structure, and the like that perform particular tasks or implement particular abstract data types. The computer system/server may be implemented in a distributed cloud computing environment. In the distributed cloud computing environment, a task is performed by a remote processing device linked through a communications network. In the distributed cloud computing environment, the program module may be located on a storage medium of a local or remote computing system including a storage device.

Application Overview

Generally, before a user officially uses a calibration cabin (for example, a cabin within a vehicle, or a room), an extrinsic parameter of a camera in the calibration cabin is calibrated; and when the user uses the calibration cabin, the extrinsic parameter has been calibrated. However, when the user uses the calibration cabin, a location and an angle of the mounted camera may be adjusted. At this time, the extrinsic parameter of the camera needs to be calibrated in a real-time manner.

Example System

FIG. 1 is an example architectural diagram of an extrinsic camera parameter calibration system 100 according to an embodiment of the present disclosure.

As shown in FIG. 1, the system architecture 100 may include a calibration cabin 101, a reference cabin 102, a first camera 103, a second camera 104, and an extrinsic parameter calibration device 105.

The first camera 103 is provided in the calibration cabin 101, and the second camera 104 is provided in the reference cabin 102. The first camera 103 and the second camera 104 are respectively provided at preset locations in the calibration cabin 101 and the reference cabin 102.

The calibration cabin 101 and the reference cabin 102 may be various types of space structures, for example, a cabin within a vehicle, a simulation cabin (for example, a cabin simulating interior of a vehicle) provided in a room, a room and the like. Usually, the reference cabin 102 may be a pre-configured simulation cabin, and an image photographed by the second camera 104 provided in the reference cabin 102 may be used as reference for performing extrinsic parameter calibration to different first cameras 103 provided in a plurality of calibration cabins 101.

The first camera 103 and the second camera 104 usually are respectively provided at same locations in the calibration cabin 101 and the reference cabin 102, and photograph same target locations. The target locations may respectively be particular locations in the calibration cabin 101 and the reference cabin 102. For example, when the calibration cabin 101 and the reference cabin 102 are cabins within a vehicle, the target locations may be a location including a part of a roof and a window of the vehicle.

Usually, due to a mounting error or movement of the camera during use, a mounting location and a shooting angle of the first camera 103 cannot be completely consistent with those of the second camera 104, and a user may adjust the location and the shooting angle of the first camera while using the calibration cabin. Therefore, extrinsic parameter calibration needs to be performed to the first camera in real time by using an extrinsic camera parameter calibration method provided by an embodiment of the present disclosure. For example, when the calibration cabin is a cabin in a vehicle, the first camera may be mounted on a steering column to photograph the face of a driver and identify a photographed image. Because the user may adjust a location of a steering wheel, the location and the shooting angle of the first camera mounted on the steering column may change accordingly. Therefore, the extrinsic parameter of the first camera needs to be calibrated in a real-time manner. An image photographed for the target location may include background in the vehicle. Therefore, features of the background may be extracted from the image and may be applied to the extrinsic parameter calibration.

The foregoing first camera 103 and second camera 104 may be various types of cameras, and correspondingly, photographed images may be various types of images, such as color images and depth images, etc.

In some optional implementations, the first camera 103 and the second camera 104 are infrared cameras, and at least two materials with chromatic aberrations in an infrared image are respectively provided in the reference cabin and the calibration cabin. The locations of these materials are the target locations photographed by the first camera and the second camera. In the infrared images photographed by the first camera 103 and the second camera 104, boundaries between different materials may be distinguished. By using an infrared camera, influence of light intensity on a calibration image and a reference image may be avoided. In a case of dark light, feature information can still be extracted from the calibration image and the reference image, thereby improving environmental adaptability of an extrinsic parameter calibration method.

The extrinsic parameter calibration device 105 may be various types of electronic devices used for extrinsic parameter calibration, including but not limited to mobile terminals such as a mobile phone, a notebook computer, a PDA (personal digital assistants), a PAD (tablet computer), and a vehicle-mounted terminal, and fixed terminals such as a digital TV and a desktop computer. The extrinsic parameter calibration device 105 may also be a remote server, and the remote server may be in a communication connection with the first camera 103, or may be connected to another electronic device that can store the images photographed by the first camera 103.

It should be noted that the extrinsic camera parameter calibration method provided in the embodiment of the present disclosure is generally implemented by the extrinsic parameter calibration device 105. Correspondingly, the extrinsic camera parameter calibration apparatus is generally disposed in the extrinsic parameter calibration device 105.

It should be understood that quantities of the calibration cabin 101, the reference cabin 102, the first camera 103, the second camera 104, and the extrinsic parameter calibration device 105 in FIG. 1 are merely exemplary. According to implementation requirements, there may be any number of calibration cabins 101, reference cabins 102, first cameras 103, second cameras 104, and extrinsic parameter calibration devices 105.

According to the system provided in the foregoing embodiment of the present disclosure, the first camera is disposed in the calibration cabin to photograph the target location in the calibration cabin to obtain the calibration image; the second camera is disposed in the reference cabin to photograph the target location in the reference cabin to obtain the reference image; the reference feature information is obtained by pre-identifying the reference image; and the extrinsic camera parameter calibration method provided in the embodiment of the present disclosure is implemented by the extrinsic parameter calibration device based on the calibration image and the reference feature information, to obtain the extrinsic parameter of the first camera. In this way, the extrinsic camera parameter calibration is performed by extracting the feature information in the image photographed by the first camera. The process of calibrating an extrinsic camera parameter is more convenient without using a calibration apparatus such as a checkerboard, thereby improving efficiency of calibrating the extrinsic camera parameter. Moreover, when the user actually uses the calibration cabin, the extrinsic parameter of the first camera may be calibrated in a real-time manner by using the image photographed by the first camera. In this way, in a case of using the extrinsic parameter, the extrinsic parameter used is closer to a currently actual state of the first camera. And then, accuracy of performing various operations (for example, human-eye sight recognition, face posture recognition, and gesture recognition) by using the extrinsic parameter is further improved.

Example Methods

Figure 2:
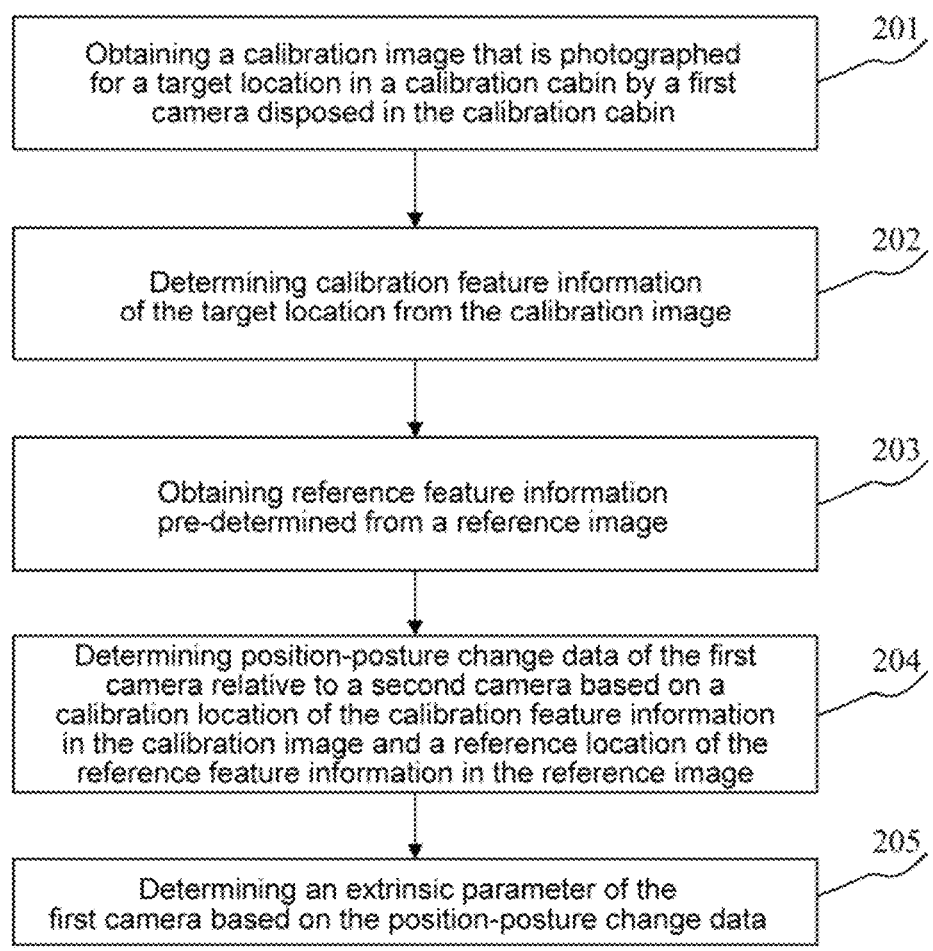
FIG. 2 is a schematic flowchart of an extrinsic camera parameter calibration method according to an exemplary embodiment of the present disclosure.

FIG. 2 is a schematic flowchart of an extrinsic camera parameter calibration method according to an exemplary embodiment of the present disclosure. This embodiment may be applied to an electronic device (for example, the extrinsic parameter calibration device 105 shown in FIG. 1). As shown in FIG. 2, the method includes the following steps:

Step 201, obtaining a calibration image that is photographed for a target location in a calibration cabin by a first camera disposed in the calibration cabin.

In this embodiment, the electronic device may locally or remotely obtain the calibration image that is photographed for the target location in the calibration cabin by the first camera disposed in the calibration cabin. The target location may be a particular location in the calibration cabin. For example, when the calibration cabin is a cabin within a vehicle, the target location may be a location including a part of a roof and a window of the vehicle.

Step 202, determining calibration feature information of the target location from the calibration image.

In this embodiment, the electronic device may determine the calibration feature information of the target location from the calibration image.

Specifically, the target location may usually have certain shape features, and the electronic device may perform feature extraction on the calibration image including the target location, to obtain the calibration feature information. The calibration feature information may include various types of feature information, such as a feature point and a feature line.

For example, when the calibration cabin is a cabin within a vehicle, the calibration feature information may indicate parts including a corner point of a vehicle window, a line-shaped gap between different parts of a roof and the like.

The electronic device may extract the calibration feature information from the calibration image according to existing feature extraction methods. For example, the feature extraction methods may include a neural network-based feature extraction method, a SIFT (scale-invariant feature transform) algorithm, a SURF (speeded up robust features) algorithm and so on.

Step 203, obtaining reference feature information pre-determined from a reference image.

In this embodiment, the electronic device may locally or remotely obtain the reference feature information pre-determined from the reference image. The reference image is an image photographed for a target location in a reference cabin by a second camera disposed in the reference cabin. The reference cabin may be a space structure that is pre-configured as a standard for performing extrinsic parameter calibration to the camera in the calibration cabin. A location of the second camera in the reference cabin is the same as that of the first camera in the calibration cabin. Usually, the method of determining the reference feature information from the reference image may be same as that of determining the calibration feature information from the calibration image.

Step 204, determining position-posture change data of the first camera relative to the second camera based on a calibration location of the calibration feature information in the calibration image and a reference location of the reference feature information in the reference image.

In this embodiment, the electronic device may determine the position-posture change data of the first camera relative to the second camera based on the calibration location of the calibration feature information in the calibration image and the reference location of the reference feature information in the reference image. The position-posture change data includes a displacement change and a shooting angle change of the location of the first camera relative to the location of the second camera.

For example, the electronic device may determine the position-posture change of the second camera relative to the first camera by using an existing epipolar constraint method.

Step 205, determining an extrinsic parameter of the first camera based on the position-posture change data.

In this embodiment, the electronic device may determine the extrinsic parameter of the first camera based on the position-posture change data. The extrinsic camera parameter may usually include a rotation matrix and a translation matrix. The rotation matrix represents a rotation direction of a coordinate axis of a camera coordinate system relative to a coordinate axis of a world coordinate system. The translation matrix represents a location of a point in space in the camera coordinate system. Generally, the extrinsic parameter of the first camera is known. Therefore, an extrinsic parameter of the second camera may be obtained according to the foregoing position-posture change.

According to the foregoing method provided in the embodiment of the present disclosure, the calibration image that is photographed for the target location in the calibration cabin by the first camera provided in the calibration cabin is obtained; the calibration feature information of the target location is determined from the calibration image; subsequently, the reference feature information pre-determined from the reference image is obtained; next, the position-posture change data of the first camera relative to the second camera is determined based on the calibration location of the calibration feature information in the calibration image and the reference location of the reference feature information in the reference image; and finally, the extrinsic parameter of the first camera is determined based on the position-posture change data. The extrinsic parameter is calibrated by using the image photographed by the first camera mounted in the calibration cabin. Therefore, in the embodiment of the present disclosure, the process of calibrating an extrinsic camera parameter may be ensured to be more convenient without using a calibration apparatus such as a checkerboard, thereby improving efficiency of calibrating the extrinsic camera parameter. Moreover, when a user actually uses the calibration cabin, the extrinsic parameter of the first camera may be calibrated in a real-time manner by using the image photographed by the first camera. In this way, in a case of using the extrinsic parameter, the extrinsic parameter used is closer to a currently actual state of the first camera. And then accuracy of performing various operations (for example, human-eye sight recognition, face posture recognition, and gesture recognition) by using the extrinsic parameter is further improved.

In some optional implementations, the foregoing step 205 may be performed as below.

First, whether the position-posture change data meets a preset camera displacement condition is determined.

The camera displacement condition is used to represent whether the position-posture change of the camera is too large. For example, the camera displacement condition may be that the position-posture change data is larger than or equal to preset position-posture change data. It should be noted that the position-posture change data includes displacement change data and shooting-angle change data. Therefore, it is determined that the position-posture change data meets the camera displacement condition when the displacement change data is larger than or equal to preset displacement change data, or the shooting-angle change data is larger than or equal to preset shooting-angle change data, or the displacement change data and the shooting-angle change data are respectively larger than or equal to the preset displacement change data and the preset shooting-angle change data.

Subsequently, if the position-posture change data meets the camera displacement condition, the extrinsic parameter of the first camera is adjusted to an extrinsic parameter corresponding to the position-posture change data based on the position-posture change data. The method of adjusting the extrinsic parameter of the first camera to the extrinsic parameter corresponding to the position-posture change data is the method described in the foregoing step 205.

Finally, if the position-posture change data does not meet the camera displacement condition, the extrinsic parameter of the first camera is kept unchanged.

In this implementation, by comparing the position-posture change data with the camera displacement condition, the extrinsic parameter may be adjusted when a position-posture change of the first camera is relatively large, thereby reducing consumption of hardware resources caused by excessively frequent adjustments of the extrinsic parameter.

In some optional implementations, step 204 may be performed as below.

First, a coordinate transformation matrix for representing a relationship between the calibration location and the reference location is determined based on the reference location and the calibration location. The coordinate transformation matrix includes at least one of the following: a fundamental matrix, an essential matrix, and a homography matrix.

The fundamental matrix reflects a relationship between locations of an image point in space in a polar coordinate system of a camera with different viewing angles.

The essential matrix reflects a relationship between locations of a point in space in an image coordinate system of a camera with different viewing angles.

The homography matrix reflects a mapping relationship between locations of an object in a world coordinate system and an image coordinate system. The corresponding transformation matrix is referred as the homography matrix.

Usually, the fundamental matrix or the essential matrix is irrelevant with a structure of a three-dimensional scene, and only depends on intrinsic parameters and extrinsic parameters of the camera, where rotations and translations of locations of two cameras are required. The homography matrix has more requirements on the structure of the three-dimensional scene, requiring points in the scene to be on a same plane; or has requirements on positions and postures of the cameras, where only rotations but no translations exist between the two cameras.

It should be noted that the foregoing method of determining the coordinate transformation matrix is prior art. For example, the essential matrix or the fundamental matrix may be obtained through the existing eight-point method and the least square method. The homography matrix may be obtained by decomposing the essential matrix.

Subsequently, the position-posture change of the second camera relative to the first camera is determined based on the coordinate transformation matrix. It should be noted that the method of obtaining the position-posture change based on the foregoing coordinate transformation matrix is current prior art, and its details are not described herein again.

According to this implementation, the position-posture change of the first camera relative to the second camera is flexibly determined based on a plurality of features of the coordinate transformation matrix, which helps to improve accuracy of extrinsic parameter calibration. For example, if a spatial location indicated by the calibration feature information is on a same plane with a spatial location indicated by the reference feature information, the homography matrix may be used; and if the spatial locations are not on a same plane, the fundamental matrix or the essential matrix may be used.

In some optional implementations, after step 204, the electronic device may further perform the following steps.

First, whether the position-posture change data meets a preset position-posture restriction condition of the first camera is determined. The preset position-posture restriction condition is used to restrict the position-posture change data, so that the position-posture change data conforms to an actual scene.

Figure 3:
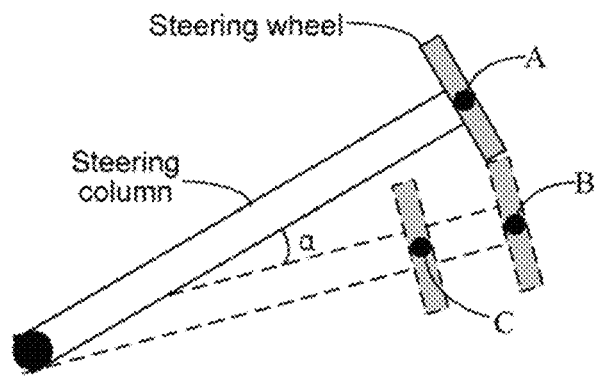
FIG. 3 is an exemplary schematic diagram of a position-posture restriction condition of an extrinsic camera parameter calibration method according to an embodiment of the present disclosure.

For example, as shown in FIG. 3, when the first camera is disposed on a steering column in a vehicle, subject to restrictions of a location adjustment manner of a steering wheel, the change in the shooting angle of the camera only includes a change in a pitch angle shown by angle α in FIG. 3, that is, a change in the pitch angle caused by that the steering wheel moves from point A to point B. Changes in a yawing angle and a rolling angle may be ignored. A displacement change of the camera only includes a displacement change in an axial direction of the steering column, that is, a displacement change of the steering wheel from the point B to the point C. In the scene shown in FIG. 3, preset position-posture restriction conditions may include that changes in the yawing angle and the rolling angle are 0, and the displacement change can only occur in a changing plane of the pitch angle.

Subsequently, if the position-posture change data does not meet the preset position-posture restriction condition, the position-posture change data is adjusted to position-posture change data meeting the preset position-posture restriction condition.

Proceeding to the foregoing example, if determined changes in the yawing angle and the rolling angle are not 0, the changes in the yawing angle and the rolling angle are set to 0.

In this implementation, by setting a position-posture restriction condition, the determined position-posture change data may be enabled to more conform to the actual scene, and thus reducing risks of identification errors.

Figure 4:
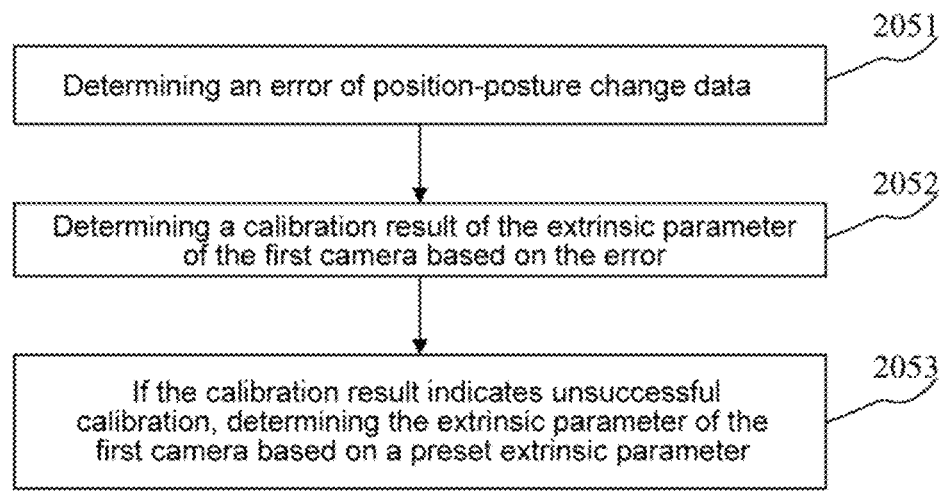
FIG. 4 is a schematic flowchart of an extrinsic camera parameter calibration method according to another exemplary embodiment of the present disclosure.

Further, refer to FIG. 4. FIG. 4 is a schematic flowchart of an extrinsic camera parameter calibration method according to still another embodiment. As shown in FIG. 4, on the basis of the foregoing embodiment shown in FIG. 2, step 205 may include the following steps.

Step 2051, determining an error of the position-posture change data.

The error of the position-posture change data may be determined in various manners. For details, reference may be made to the following optional implementations.

Step 2052, determining a calibration result of the extrinsic parameter of the first camera based on the error.

The calibration result indicates successful or unsuccessful calibration. For example, if the error is larger than or equal to a preset error threshold, a calibration result indicating unsuccessful calibration is generated; and if the error is smaller than the error threshold, a calibration result indicating successful calibration is generated.

Step 2053, determining the extrinsic parameter of the first camera based on a preset extrinsic parameter if the calibration result indicates unsuccessful calibration.

Specifically, when the calibration is unsuccessful, the preset extrinsic parameter may be taken as the extrinsic parameter of the first camera. Usually, the preset extrinsic parameter may be an extrinsic parameter obtained by performing the extrinsic parameter calibration to the first camera before the calibration cabin is delivered to the user for use. For example, when the calibration cabin is a cabin within a vehicle, the extrinsic parameter calibration may be performed to the first camera on the vehicle before the vehicle is delivered, to obtain the preset extrinsic parameter.

It should be understood that if the calibration is successful, a determined extrinsic parameter is taken as the extrinsic parameter of the first camera.

According to the method described in the foregoing embodiment corresponding to FIG. 4, whether the calibration is successful is determined by determining the error of the position-posture change data. A default extrinsic parameter is used when the calibration is unsuccessful so as to prevent the extrinsic parameter from deviating from an actual situation because the error of the position-posture change data is relatively large. In this way, a finally determined extrinsic camera parameter is more accurate.

In some optional implementations, the foregoing step 2051 may be performed as below.

First, a reprojection error of the calibration feature information relative to the reference feature information is determined based on the extrinsic parameter of the first camera. The reprojection error may be a deviation between a location where the calibration feature information in the calibration image is projected into the reference image and a location of the corresponding reference feature information.

Optionally, the extrinsic parameter may be calibrated by using some feature information (such as some feature points) in the calibration feature information, and the reprojection error may be determined by using other feature information, so as to effectively detect the extrinsic parameter.

Subsequently, the error of the position-posture change data is determined based on the reprojection error. Usually, the reprojection error may be determined as the error of the position-posture change data.

On this basis, step 2052 may be performed as below.

Whether the extrinsic parameter of the first camera is successfully calibrated is determined based on the reprojection error and a preset first calibration success condition. For example, the first calibration success condition may be that the reprojection error is smaller than a preset reprojection error threshold. If the reprojection error meets the first calibration success condition, it is determined that the calibration is successful, or otherwise it is determined that the calibration is failed.

In this implementation, whether the calibration is successful is determined by determining the reprojection error, so that the finally determined extrinsic camera parameter is more accurate.

In some optional implementations, the foregoing step 2051 may be performed as below.

A difference between the position-posture change data and a preset position-posture change data threshold is determined as the error of the position-posture change data. For example, the position-posture change data subtracts the position-posture change data threshold, and if the difference is larger than zero, the error is the difference. In this case, if the position-posture change data is larger than a set value, it indicates that the image collected by the first camera may be distorted due to jitter, faults, and the like of the camera. If the difference is smaller than or equal to zero, the error is zero, and it indicates that the position-posture change data is normal.

On this basis, step 2052 may be performed as below.

Whether the extrinsic parameter of the first camera is successfully calibrated is determined based on the error and a preset second calibration success condition. Proceeding to the foregoing example, the second calibration success condition may be that the error is zero. When the determined error meets the second calibration success condition, it is determined that the calibration is successful. If the error is not zero, it is determined that the calibration is unsuccessful.

In this implementation, whether the calibration is successful is determined based on the position-posture change data. When the position-posture change data is not within a normal range, it may be determined that the calibration is unsuccessful, so that the finally determined extrinsic camera parameter is more accurate.

Example Apparatus

Figure 5:
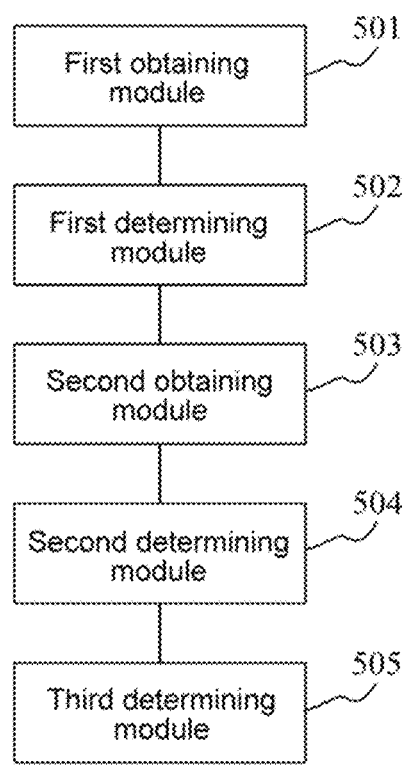
FIG. 5 is a schematic structural diagram of an extrinsic camera parameter calibration apparatus according to an exemplary embodiment of the present disclosure.

FIG. 5 is a schematic structural diagram of an extrinsic camera parameter calibration apparatus according to an exemplary embodiment of the present disclosure. This embodiment may be applied to an electronic device. As shown in FIG. 5, the extrinsic camera parameter calibration apparatus includes: a first obtaining module 501 which is configured to obtain a calibration image that is photographed for a target location in a calibration cabin by a first camera provided in the calibration cabin; a first determining module 502 which is configured to determine calibration feature information of the target location from the calibration image; a second obtaining module 503 which is configured to obtain reference feature information pre-determined from a reference image, wherein the reference image is an image photographed for a target location in a reference cabin by a second camera provided in the reference cabin; a second determining module 504 which is configured to determine position-posture change data of the first camera relative to the second camera based on a calibration location of the calibration feature information in the calibration image and a reference location of the reference feature information in the reference image; and a third determining module 505 which is configured to determine an extrinsic parameter of the first camera based on the position-posture change data.

In this embodiment, the first obtaining module 501 may locally or remotely obtain the calibration image that is photographed for the target location in the calibration cabin by the first camera disposed in the calibration cabin. The target location may be a particular location in the calibration cabin. For example, when the calibration cabin is a cabin within a vehicle, the target location may be a location including a part of a roof and a window of the vehicle.

In this embodiment, the first determining module 502 may determine the calibration feature information of the target location from the calibration image.

Specifically, the target location may usually have certain shape features, and the first determining module 502 may perform feature extraction on the calibration image including the target location, to obtain the calibration feature information. The calibration feature information may include various types of feature information, such as a feature point and a feature line.

For example, when the calibration cabin is a cabin within a vehicle, the calibration feature information may indicate parts including a corner point of a vehicle window and a line-shaped gap between different parts of a roof, etc.

The first determining module 502 may extract the calibration feature information from the calibration image according to existing feature extraction methods. For example, the feature extraction methods may include a neural network-based feature extraction method, an SIFT (scale-invariant feature transform) algorithm, and a SURF (speeded up robust features) algorithm, etc.

In this embodiment, the second obtaining module 503 may locally or remotely obtain the reference feature information pre-determined from the reference image. The reference image is an image photographed for the target location in the reference cabin by the second camera disposed in the reference cabin. The reference cabin may be a space structure that is pre-configured as a standard for performing extrinsic parameter calibration to the camera in the calibration cabin. A location of the second camera in the reference cabin is the same as that of the first camera in the calibration cabin. Usually, the method of determining the reference feature information from the reference image may be the same as that of determining the calibration feature information from the calibration image.

In this embodiment, the second determining module 504 may determine the position-posture change data of the first camera relative to the second camera based on the calibration location of the calibration feature information in the calibration image and the reference location of the reference feature information in the reference image. The position-posture change data includes a displacement change and a shooting angle change of the location of the first camera relative to the location of the second camera.

For example, the second determining module 504 may determine a position-posture change of the second camera relative to the first camera by using an existing epipolar constraint method.

In this embodiment, the third determining module 505 may determine the extrinsic parameter of the first camera based on the position-posture change data. The extrinsic camera parameter may usually include a rotation matrix and a translation matrix. The rotation matrix represents a rotation direction of a coordinate axis of a camera coordinate system relative to a coordinate axis of a world coordinate system. The translation matrix represents a location of a point in space in the camera coordinate system. Generally, the extrinsic parameter of the first camera is known. Therefore, an extrinsic parameter of the second camera may be obtained according to the foregoing position-posture change.

Figure 6:
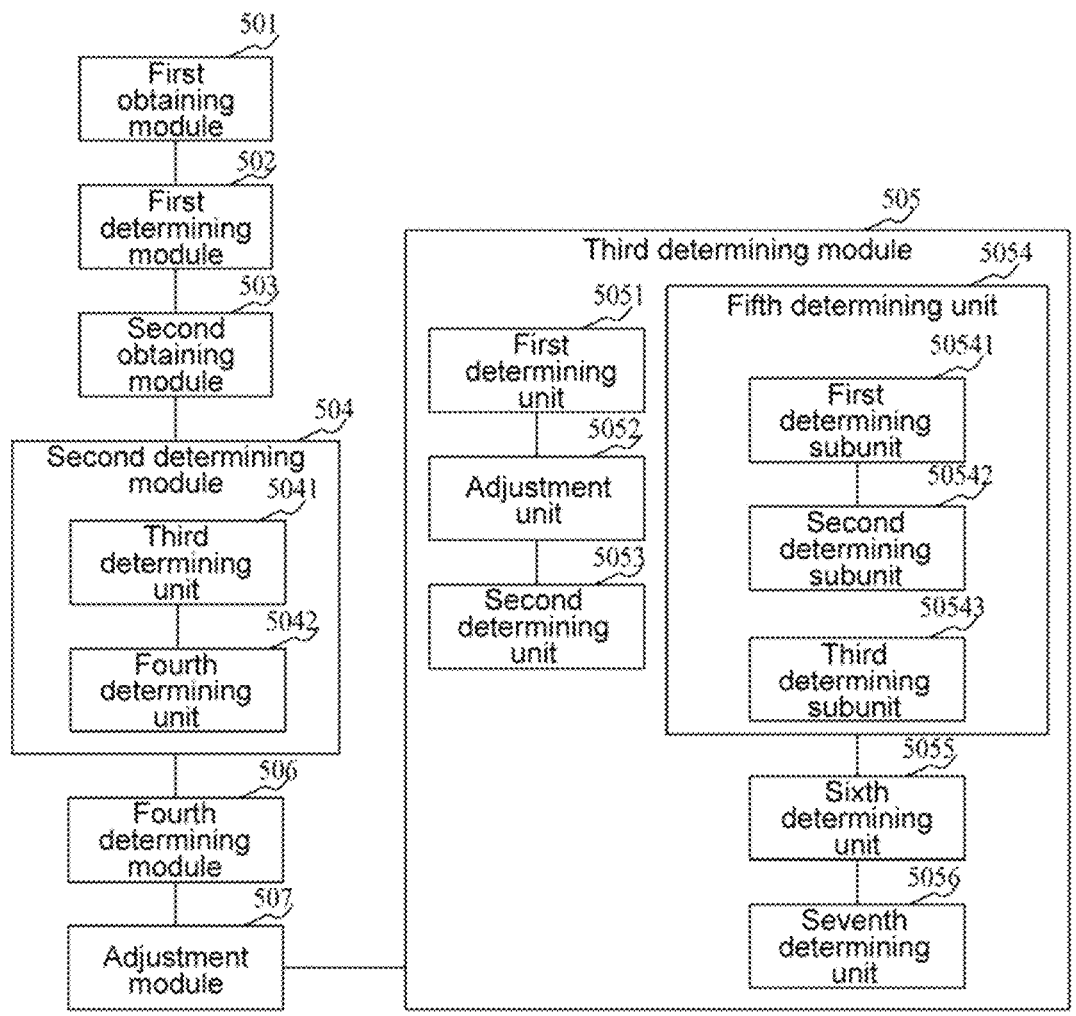
FIG. 6 is a schematic structural diagram of an extrinsic camera parameter calibration apparatus according to another exemplary embodiment of the present disclosure.

Referring to FIG. 6, it is a schematic structural diagram of an extrinsic camera parameter calibration apparatus according to another exemplary embodiment of the present disclosure.

In some optional implementations, the third determining module 505 includes: a first determining unit 5051 which is configured to determine whether the position-posture change data meets a preset camera displacement condition; an adjustment unit 5052 which is configured to adjust, based on the position-posture change data, the extrinsic parameter of the first camera to an extrinsic parameter corresponding to the position-posture change data if the position-posture change data meets the preset camera displacement condition; and a second determining unit 5053 which is configured to keep the extrinsic parameter of the first camera unchanged if the position-posture change data does not meet the camera displacement condition.

In some optional implementations, the second determining module 504 includes: a third determining unit 5041 which is configured to determine a coordinate transformation matrix for representing a relationship between a calibration location and a reference location based on the reference location and the calibration location, wherein the coordinate transformation matrix includes at least one of a fundamental matrix, an essential matrix, and a homography matrix; and a fourth determining unit 5042 which is configured to determine a position-posture change of the second camera relative to the first camera based on the coordinate transformation matrix.

In some optional implementations, the apparatus further includes: a fourth determining module 506 which is configured to determine whether the position-posture change data meets a preset position-posture restriction condition of the first camera; and an adjustment module 507 which is configured to adjust the position-posture change data to position-posture change data meeting the preset position-posture restriction condition if the position-posture change data does not meet the preset position-posture restriction condition.

In some optional implementations, the third determining module 505 includes: a fifth determining unit 5054 which is configured to determine an error of the position-posture change data; a sixth determining unit 5055 which is configured to determine a calibration result of the extrinsic parameter of the first camera based on the error; and a seventh determining unit 5056 which is configured to determine the extrinsic parameter of the first camera based on a preset extrinsic parameter if the calibration result indicates unsuccessful calibration.

In some optional implementations, the fifth determining unit 5054 includes: a first determining subunit 50541 which is configured to determine a reprojection error of the calibration feature information relative to the reference feature information based on the extrinsic parameter of the first camera; a second determining subunit 50542 which is configured to determine the error of the position-posture change data based on the reprojection error; and the sixth determining unit 5055 which is further configured to determine, based on the reprojection error and a preset first calibration success condition, whether the extrinsic parameter of the first camera is successfully calibrated.

In some optional implementations, the fifth determining unit 5054 includes: a third determining subunit 50543 which is configured to determine a difference between the position-posture change data and a preset position-posture change data threshold as the error of the position-posture change data; and the sixth determining unit 5055 which is further configured to determine, based on the error and a preset second calibration success condition, whether the extrinsic parameter of the first camera is successfully calibrated.

According to the extrinsic camera parameter calibration apparatus provided in the foregoing embodiments of the present disclosure, the calibration image that is photographed for the target location in the calibration cabin by the first camera provided in the calibration cabin is obtained; the calibration feature information of the target location is determined from the calibration image; subsequently, the reference feature information pre-determined from the reference image is obtained; next, the position-posture change data of the first camera relative to the second camera is determined based on the calibration location of the calibration feature information in the calibration image and the reference location of the reference feature information in the reference image; and finally, the extrinsic parameter of the first camera is determined based on the position-posture change data. The extrinsic parameter is calibrated by using the image photographed by the first camera mounted in the calibration cabin. Therefore, in the embodiments of the present disclosure, the process of calibrating an extrinsic camera parameter may be ensured to be more convenient without using a calibration apparatus such as a checkerboard, thereby improving efficiency of calibrating the extrinsic camera parameter. Moreover, when a user actually uses the calibration cabin, the extrinsic parameter of the first camera may be calibrated in a real-time manner by using the image photographed by the first camera. In this way, in a case of using the extrinsic parameter, the extrinsic parameter used is closer to a current actual state of the first camera. And then, accuracy of performing various operations (for example, human-eye sight recognition, face posture recognition, and gesture recognition) by using the extrinsic parameter is further improved.

Example Electronic Device

In the following, an electronic device according to an embodiment of the present disclosure is described with reference to FIG. 7. The electronic device may be any one or two of the terminal device 101 and the server 103 shown in FIG. 1, or a stand-alone device independent from the terminal device 101 and the server 103. The stand-alone device may communicate with the terminal device 101 and the server 103, to receive a collected input signal therefrom.

Figure 7:
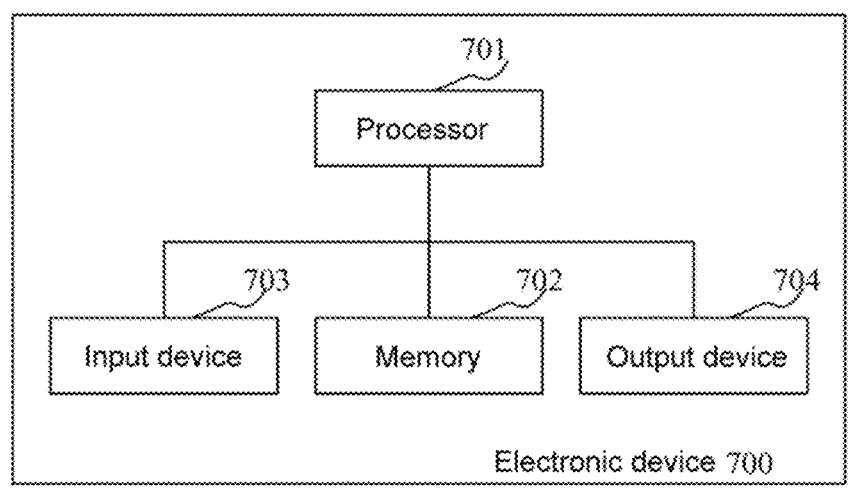
FIG. 7 is a structural diagram of an electronic device according to an exemplary embodiment of the present disclosure.

FIG. 7 is a block diagram of an electronic device according to an embodiment of the present disclosure.

As shown in FIG. 7, an electronic device 700 includes one or more processors 701 and a memory 702.

The processor 701 may be a central processing unit (CPU) or another form of processing unit having a data processing capability and/or an instruction execution capability, and it may control another component in the electronic device 700 to perform an expected function.

The memory 702 may include one or more computer program products, and the computer program product may include various forms of computer-readable storage media, such as a volatile memory and/or a non-volatile memory. The volatile memory may include, for example, a random access memory (RAM) and/or a cache memory (cache). The nonvolatile memory may include, for example, a read-only memory (ROM), a hard disk, and a flash memory and so on.

One or more computer program instructions may be stored on the computer-readable storage medium. The processor 701 may run the program instruction(s) to implement the extrinsic camera parameter calibration method according to the foregoing various embodiments of the present disclosure and/or other expected functions. Calibration image, calibration feature information, reference feature information, and other content may also be stored in the computer-readable storage medium.

In an example, the electronic device 700 may further include an input device 703 and an output device 704, and these components are interconnected by a bus system and/or another form of connection mechanism (not shown).

For example, when the electronic device is the terminal device 101 or the server 103, the input device 703 may be a device such as a camera, a mouse, or a keyboard for inputting information such as an image. When the electronic device is a stand-alone device, the input device 703 may be a communication network connector for receiving the input image and other information from the terminal device 101 and the server 103.

The output device 704 may output various information to the outside, including a determined extrinsic camera parameter. The output device 704 may include, for example, a display, a speaker, a printer, a communication network, and a remote output device connected to the communication network.

Certainly, for simplicity, FIG. 7 only shows some of components in the electronic device 700 that are related to the present disclosure, and components such as a bus and an input/output interface are omitted. In addition, according to specific application conditions, the electronic device 700 may further include any other appropriate components.

Example Computer Program Product and Computer-Readable Storage Medium

In addition to the foregoing methods and devices, the embodiments of the present disclosure may also relate to a computer program product, which includes computer program instructions. When run by a processor, the computer program instructions enables the processor to execute the steps, of the extrinsic camera parameter calibration method according to the embodiments of the present disclosure, which are described in the "example method" part of this specification.

The computer program product may write program codes for executing operations of the embodiments of the present disclosure by using any combination of one or more programming languages. The programming languages include an object-oriented programming language, such as Java or C++; and also include a conventional procedural programming language, such as the "C" language or a similar programming language. The program codes may be entirely executed on a computing device of a user, partially executed on a user device, executed as an independent software package, partially executed on the computing device of the user and partially executed on a remote computing device, or entirely executed on the remote computing device or a server.

In addition, the embodiments of the present disclosure may also relate to a computer-readable storage medium, which stores computer program instructions. When run by the processor, the computer program instructions enable the processor to execute the steps, of the extrinsic camera parameter calibration method according to the embodiments of the present disclosure, which are described in the "example method" part of this specification.

The computer-readable storage medium may be any combination of one or more readable media. The readable medium may be a readable signal medium or a readable storage medium. The readable storage medium may include, for example, but is not limited to an electrical, a magnetic, an optical, an electromagnetic, an infrared, or a semiconductor system, apparatus, or device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The basic principles of the present disclosure are described above in combination with the specific embodiments. However, it should be pointed out that the advantages, superiorities, and effects referred in the present disclosure are only examples but are not for limitations, and it cannot be considered that these advantages, superiorities, and effects are necessary for each embodiment of the present disclosure. In addition, the foregoing disclosed specific details are merely exemplary and for ease of understanding, rather than limitations. The foregoing details do not limit that the present disclosure must be implemented by using the foregoing specific details.

The embodiments in this specification are all described in a progressive manner. For each embodiment, emphases are put on differences between this embodiment and other embodiments. For same or similar parts between the embodiments, reference may be made to each other. The system embodiments basically correspond to the method embodiments, and thus are relatively simply described. For related parts, please refer to descriptions in the part of the method embodiments.

The block diagrams of the equipment, the apparatus, the device, and the system involved in the present disclosure are merely exemplary examples and are not intended to require or imply that the equipment, the apparatus, the device, and the system must be connected, arranged, and configured in the manners shown in the block diagrams. As a person skilled in the art may recognize, the equipment, the apparatus, the device, and the system may be connected, arranged, and configured in any manner. Terms such as "include", "include", "contain", and "have" are open terms that mean "include but not limited to", and may be used interchangeably with "include but not limited to". The terms "or" and "and" used herein refer to the term "and/or", and may be used interchangeably with "and/or', unless the context clearly indicates otherwise. The term "such as" used herein refers to the phrase "such as but not limited to", and may be used interchangeably with "such as but not limited to".

The method and the apparatus of the present disclosure may be implemented in many ways. For example, the method and the apparatus of the present disclosure may be implemented by software, hardware, firmware, or any combination of the software, the hardware, and the firmware. The foregoing order of the steps of the method is for illustration only, and the steps of the method of the present disclosure are not limited to the order specifically described above, unless otherwise specifically stated. In addition, in some embodiments, the present disclosure may also be implemented as programs recorded in a recording medium, and these programs include machine-readable instructions for implementing the method according to the present disclosure. Therefore, the present disclosure also covers a recording medium storing a program for executing the method according to the present disclosure.

It should also be pointed out that, in the apparatus, the device, and the method of the present disclosure, each component or each step may can be decomposed and/or recombined. These decomposition and/or recombination should be regarded as equivalent solutions of the present disclosure.

The foregoing description about the disclosed aspects is provided to enable any person skilled in the art to arrive at or use the present disclosure. Various modifications to these aspects are very obvious to a person skilled in the art, and the general principles defined herein may be applied to other aspects without departing from the scope of the present disclosure. Therefore, the present disclosure is not intended to be limited to the aspect shown here, but is to be accorded a widest scope consistent with the principles and novel features disclosed herein.

The foregoing description has been given for the purposes of illustration and description. In addition, this description is not intended to limit the embodiments of the present disclosure to a form disclosed herein. Although a plurality of example aspects and embodiments have been discussed above, a person skilled in the art may recognize certain variations, modifications, changes, additions, and sub-combinations thereof.

What is claimed is:

1. An extrinsic camera parameter calibration method, including:
   obtaining a calibration image that is photographed for a target location in a calibration cabin by a first camera provided in the calibration cabin;
   determining calibration feature information of the target location from the calibration image;
   obtaining reference feature information pre-determined from a reference image, wherein the reference image is an image photographed for a target location in a reference cabin by a second camera provided in the reference cabin, wherein the reference cabin is a simulation cabin which is a space structure that is pre-configured as a standard for performing extrinsic parameter calibration to the camera in the calibration cabin, the first camera and the second camera are respectively provided at same locations in the calibration cabin and the reference cabin, and the target location in the reference cabin is the same as the target location in the calibration cabin;
   determining position-posture change data of the first camera relative to the second camera based on a calibration location of the calibration feature information in the calibration image and a reference location of the reference feature information in the reference image; and
   determining an extrinsic parameter of the first camera based on the position-posture change data.

2. The method according to claim 1, wherein the determining an extrinsic parameter of the first camera based on the position-posture change data includes:
   determining whether the position-posture change data meets a preset camera displacement condition;
   if the position-posture change data meets the preset camera displacement condition, adjusting the extrinsic parameter of the first camera to an extrinsic parameter corresponding to the position-posture change data based on the position-posture change data; and if the position-posture change data does not meet the preset camera displacement condition, keeping the extrinsic parameter of the first camera unchanged.

3. The method according to claim 1, wherein the determining position-posture change data of the first camera relative to the second camera based on a calibration location of the calibration feature information in the calibration image and a reference location of the reference feature information in the reference image includes:
determining, based on the reference location and the calibration location, a coordinate transformation matrix for representing a relationship between the calibration location and the reference location, wherein the coordinate transformation matrix includes at least one of the following: a fundamental matrix, an essential matrix, and a homography matrix; and
determining a position-posture change of the second camera relative to the first camera based on the coordinate transformation matrix.

4. The method according to claim 1, wherein after the determining position-posture change data of the first camera relative to the second camera based on a calibration location of the calibration feature information in the calibration image and a reference location of the reference feature information in the reference image, the method further includes:
determining whether the position-posture change data meets a preset position-posture restriction condition of the first camera; and
if the position-posture change data does not meet the preset position-posture restriction condition, adjusting the position-posture change data to position-posture change data meeting the preset position-posture restriction condition.

5. The method according to claim 1, wherein the determining an extrinsic parameter of the first camera based on the position-posture change data includes:
determining an error of the position-posture change data;
determining a calibration result of the extrinsic parameter of the first camera based on the error; and
if the calibration result indicates unsuccessful calibration, determining the extrinsic parameter of the first camera based on a preset extrinsic parameter.

6. The method according to claim 5, wherein the determining an error of the position-posture change data includes:
determining a reprojection error of the calibration feature information relative to the reference feature information based on the extrinsic parameter of the first camera; and
determining the error of the position-posture change data based on the reprojection error;
wherein the determining a calibration result of the extrinsic parameter of the first camera based on the error includes:
based on the reprojection error and a preset first calibration success condition, determining whether the extrinsic parameter of the first camera is successfully calibrated.

7. The extrinsic camera parameter calibration system according to claim 1, wherein when the calibration cabin is a cabin within a vehicle, the target location is a location including a part of a roof and/or a window of the vehicle.

8. An extrinsic camera parameter calibration system including:
a calibration cabin;
a reference cabin;
a first camera provided at a preset location in the calibration cabin;
a second camera provided at a preset location in the reference cabin; and
an extrinsic parameter calibration device configured to implement an extrinsic camera parameter calibration method including:
obtaining a calibration image that is photographed for a target location in the calibration cabin by the first camera;
determining calibration feature information of the target location from the calibration image;
obtaining reference feature information pre-determined from a reference image, wherein the reference image is an image photographed for a target location in the reference cabin by the second camera, wherein the reference cabin is a simulation cabin which is a space structure that is pre-configured as a standard for performing extrinsic parameter calibration to the camera in the calibration cabin, the first camera and the second camera are respectively provided at same locations in the calibration cabin and the reference cabin, and the target location in the reference cabin is the same as the target location in the calibration cabin;
determining position-posture change data of the first camera relative to the second camera based on a calibration location of the calibration feature information in the calibration image and a reference location of the reference feature information in the reference image; and
determining an extrinsic parameter of the first camera based on the position-posture change data.

9. The extrinsic camera parameter calibration system according to claim 8, wherein the determining an extrinsic parameter of the first camera based on the position-posture change data includes:
determining whether the position-posture change data meets a preset camera displacement condition;
if the position-posture change data meets the preset camera displacement condition, adjusting the extrinsic parameter of the first camera to an extrinsic parameter corresponding to the position-posture change data based on the position-posture change data; and
if the position-posture change data does not meet the preset camera displacement condition, keeping the extrinsic parameter of the first camera unchanged.

10. The extrinsic camera parameter calibration system according to claim 8, wherein the determining position-posture change data of the first camera relative to the second camera based on a calibration location of the calibration feature information in the calibration image and a reference location of the reference feature information in the reference image includes:
determining, based on the reference location and the calibration location, a coordinate transformation matrix for representing a relationship between the calibration location and the reference location, wherein the coordinate transformation matrix includes at least one of the following: a fundamental matrix, an essential matrix, and a homography matrix; and
determining a position-posture change of the second camera relative to the first camera based on the coordinate transformation matrix.

11. The extrinsic camera parameter calibration system according to claim 8, wherein after the determining position-posture change data of the first camera relative to the second camera based on a calibration location of the calibration feature information in the calibration image and a reference location of the reference feature information in the reference image, the method further includes:
- determining whether the position-posture change data meets a preset position-posture restriction condition of the first camera; and
- if the position-posture change data does not meet the preset position-posture restriction condition, adjusting the position-posture change data to position-posture change data meeting the preset position-posture restriction condition.

12. The extrinsic camera parameter calibration system according to claim 8, wherein the determining an extrinsic parameter of the first camera based on the position-posture change data includes:
- determining an error of the position-posture change data;
- determining a calibration result of the extrinsic parameter of the first camera based on the error; and
- if the calibration result indicates unsuccessful calibration, determining the extrinsic parameter of the first camera based on a preset extrinsic parameter.

13. The extrinsic camera parameter calibration system according to claim 12, wherein the determining an error of the position-posture change data includes:
- determining a reprojection error of the calibration feature information relative to the reference feature information based on the extrinsic parameter of the first camera; and
- determining the error of the position-posture change data based on the reprojection error;
- wherein the determining a calibration result of the extrinsic parameter of the first camera based on the error includes:
- based on the reprojection error and a preset first calibration success condition, determining whether the extrinsic parameter of the first camera is successfully calibrated.

14. The extrinsic camera parameter calibration system according to claim 8, wherein when the calibration cabin is a cabin within a vehicle, the target location is a location including a part of a roof and/or a window of the vehicle.

15. An electronic device, wherein the electronic device includes:
- a processor; and
- a memory configured to store processor-executable instructions,
- wherein the processor is configured to read the executable instructions from the memory, and execute the instructions to implement an extrinsic camera parameter calibration method including:
  - obtaining a calibration image that is photographed for a target location in a calibration cabin by a first camera provided in the calibration cabin;
  - determining calibration feature information of the target location from the calibration image;
  - obtaining reference feature information pre-determined from a reference image, wherein the reference image is an image photographed for a target location in a reference cabin by a second camera provided in the reference cabin, wherein the reference cabin is a simulation cabin which is a space structure that is pre-configured as a standard for performing extrinsic parameter calibration to the camera in the calibration cabin, the first camera and the second camera are respectively provided at same locations in the calibration cabin and the reference cabin, and the target location in the reference cabin is the same as the target location in the calibration cabin;
  - determining position-posture change data of the first camera relative to the second camera based on a calibration location of the calibration feature information in the calibration image and a reference location of the reference feature information in the reference image; and
  - determining an extrinsic parameter of the first camera based on the position-posture change data.

16. The electronic device according to claim 15, wherein the determining an extrinsic parameter of the first camera based on the position-posture change data includes:
- determining whether the position-posture change data meets a preset camera displacement condition;
- if the position-posture change data meets the preset camera displacement condition, adjusting the extrinsic parameter of the first camera to an extrinsic parameter corresponding to the position-posture change data based on the position-posture change data; and
- if the position-posture change data does not meet the preset camera displacement condition, keeping the extrinsic parameter of the first camera unchanged.

17. The electronic device according to claim 15, wherein the determining position-posture change data of the first camera relative to the second camera based on a calibration location of the calibration feature information in the calibration image and a reference location of the reference feature information in the reference image includes:
- determining, based on the reference location and the calibration location, a coordinate transformation matrix for representing a relationship between the calibration location and the reference location, wherein the coordinate transformation matrix includes at least one of the following: a fundamental matrix, an essential matrix, and a homography matrix; and
- determining a position-posture change of the second camera relative to the first camera based on the coordinate transformation matrix.

18. The electronic device according claim 15, wherein when the calibration cabin is a cabin within a vehicle, the target location is a location including a part of a roof and/or a window of the vehicle,
or,
after the determining position-posture change data of the first camera relative to the second camera based on a calibration location of the calibration feature information in the calibration image and a reference location of the reference feature information in the reference image, the method further includes:
- determining whether the position-posture change data meets a preset position-posture restriction condition of the first camera; and
- if the position-posture change data does not meet the preset position-posture restriction condition, adjusting the position-posture change data to position-posture change data meeting the preset position-posture restriction condition.

19. The electronic device according to claim 15, wherein the determining an extrinsic parameter of the first camera based on the position-posture change data includes:
- determining an error of the position-posture change data;
- determining a calibration result of the extrinsic parameter of the first camera based on the error; and
- if the calibration result indicates unsuccessful calibration, determining the extrinsic parameter of the first camera based on a preset extrinsic parameter.

20. The electronic device according to claim 19, wherein the determining an error of the position-posture change data includes:
- determining a reprojection error of the calibration feature information relative to the reference feature information based on the extrinsic parameter of the first camera; and
- determining the error of the position-posture change data based on the reprojection error;
- wherein the determining a calibration result of the extrinsic parameter of the first camera based on the error includes:
- based on the reprojection error and a preset first calibration success condition, determining whether the extrinsic parameter of the first camera is successfully calibrated.

\* \* \* \* \*